(No Model.)
M. W. LANE.
STALK OR TRASH CUTTER.
No. 499,744. Patented June 20, 1893.
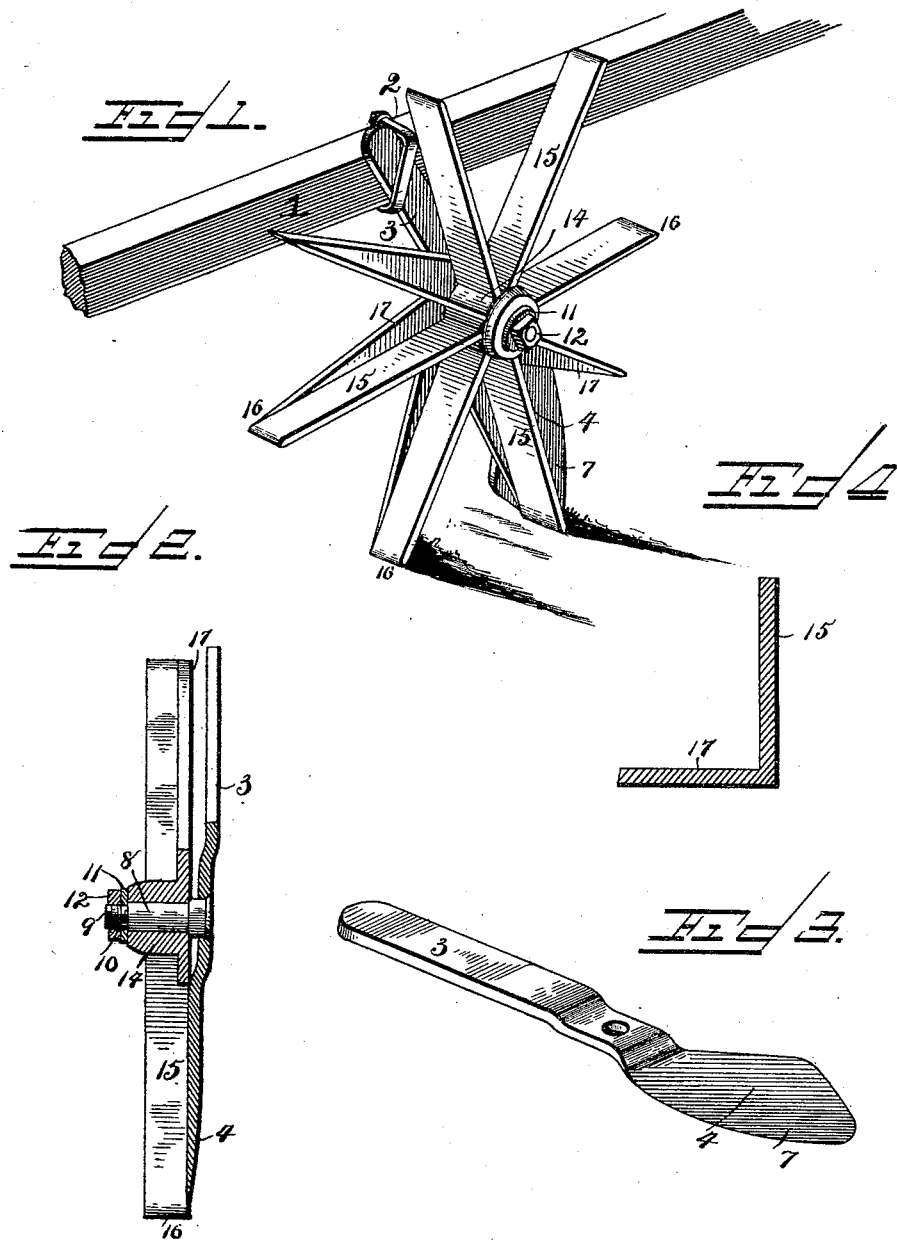

UNITED STATES PATENT OFFICE.

MADISON W. LANE, OF HILLSBOROUGH, OHIO, ASSIGNOR OF ONE-HALF TO FRED H. DOGGETT, OF SAME PLACE.

STALK OR TRASH CUTTER.

SPECIFICATION forming part of Letters Patent No. 499,744, dated June 20, 1893.

Application filed January 25, 1893. Serial No. 459,686. (No model.)

*To all whom it may concern:*

Be it known that I, MADISON W. LANE, a citizen of the United States, residing at Hillsborough, in the county of Highland and State of Ohio, have invented a new and useful Stalk or Trash Cutter, of which the following is a specification.

My invention relates to a new and improved attachment for plows; the objects in view being to provide a device that may be conveniently attached to the sides of plow-beams, and which, when in position, will efficiently operate to sever all undergrowth, stubble, or corn-stalks, clover, &c., and thus facilitate the passage therethrough of the plow-point and permit said plow to turn the severed obstructions over and into the furrow, whereby they are utilized for fertilizing purposes.

With these objects in view the invention consists in certain features of construction hereinafter specified and particularly pointed out in the claims.

Referring to the drawings:—Figure 1 is a perspective view of a plow-beam, the same being provided with an attachment constructed in accordance with my invention. Fig. 2 is a vertical transverse sectional view of the same. Fig. 3 is a detail in perspective of the blade. Fig. 4 is a transverse sectional view of one of the arms or spokes of the wheel.

Like numerals of reference indicate like parts in all the figures of the drawings.

1 designates a portion of an ordinary plow-beam, and to the same is secured, in this instance, by an ordinary clip 2, or it may be by any other means, the shank 3 of the cutter or blade 4. The shank and cutter are formed integral, the said shank being bent adjacent to the point where it merges into the cutter, whereby said cutter is offset out of alignment with the said shank. The cutter is provided with a forward cutting edge 7, and immediately above said cutter the shank has extended therefrom a bearing-pin or journal 8. The bearing or journal 8 is cylindrical for the major portion of its length, and has its outer extremity reduced and threaded as at 9, the base of said reduced portion being provided with square shoulders 10, over which is adapted to fit a washer 11 having a rectangular opening, whereby it is prevented from rotating, and by reason of the enlarged portion of the journal is prevented from moving down upon the same beyond the shoulder. Beyond the washer a nut 12 is threaded on the reduced end of the journal and serves to maintain the washer in position.

The wheel consists of a hub 14, and from the same radiates a series of arms or spokes 15, whose outer ends are beveled as at 16 whose greatest transverse width are in longitudinal alignment with the hub. The spokes or arms are preferably formed L-shaped in cross-section, and therefore are provided at their inner edges with flanges 17. These flanges are tangentially-disposed at their outer edges and extend from the inner edge of one arm to the corresponding edge of the arm immediately in rear thereof, and inasmuch as the cutter or blade is located adjacent to the said flanges, the obstructions such as undergrowth, corn-stalks, sapling-clover, &c., are caught up by the blade, and the same moving by successively, the arms composing the wheel serve to cut the same against said flanges.

In operation, the wheel, it will be observed, is adapted to travel upon the ground and rotate, that is, the ends of its arms take a short distance into the ground, and thus facilitate to a great extent the easy travel of the plow through the soil. The blade extends a short distance into the ground and engages with any of the undergrowth or obstructions that may lie in its path and, moving by the temporarily stationary adjacent arm, serves to cut or sever the same, thus preventing such obstruction impeding the progress of the plow. By the arrangement of the nut and washer and the peculiar shape of journal-pin it will be seen that the wheel is prevented from actual contact with the blade, so that there is no friction between the two, and yet they are sufficiently close to accomplish the cutting and to almost act as a self-sharpening medium.

Having described my invention, what I claim is—

1. The combination with a plow-beam, of a depending shank terminating at its lower end in a cutting-blade having a curved edge said shank being provided upon its outer side above its offset with a horizontally-disposed journal-pin, a hub secured for rotation upon the pin, and a series of radial arms, extending from the hub each arm being connected to its adjacent companion by a thin blade or flange tangentially disposed adapted to be operated against by the cutting-blade, substantially as specified.

2. The combination with a plow-beam, of a shank having its lower end offset and shaped to form a straight cutting-blade having a curved edge, a journal-pin extending from the shank above the offset and having its outer end reduced to form a rectangular shoulder and beyond the same a cylindrical threaded-portion, a washer having a rectangular opening fitting immovably over the shoulder, a nut mounted on the threaded portion of the pin, a hub loosely mounted on the journal-pin between the washer and the blade and out of contact at its inner end with the blade, and a series of radial arms extending from the hub and having inner flanged-portions tangentially disposed and connecting each arm with its adjacent companion, said flanges being arranged at right angles to said arms and adapted to operate against the blade, substantially as specified.

In testimony that I claim the foregoing as my own I have hereto affixed my signature in the presence of two witnesses.

M. W. LANE.

Witnesses:
F. H. DOGGETT,
W. H. WALKER.